United States Patent
Tashiro et al.

(10) Patent No.: US 10,389,915 B2
(45) Date of Patent: Aug. 20, 2019

(54) ESTIMATING COLORIMETRIC VALUE OF MEASURED TARGET IMAGE

(71) Applicant: FUJI XEROX CO., LTD., Tokyo (JP)

(72) Inventors: Yosuke Tashiro, Kanagawa (JP); Masahiko Kubo, Kanagawa (JP); Kaoru Yamauchi, Kanagawa (JP); Ayako Watanabe, Kanagawa (JP); Kaori Iwaki, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/943,942

(22) Filed: Apr. 3, 2018

(65) Prior Publication Data
US 2019/0068838 A1    Feb. 28, 2019

(30) Foreign Application Priority Data

Aug. 25, 2017  (JP) .................................. 2017-161874

(51) Int. Cl.
*H04N 1/54* (2006.01)
*G06K 9/46* (2006.01)
*G01J 3/52* (2006.01)

(52) U.S. Cl.
CPC ................ *H04N 1/54* (2013.01); *G01J 3/526* (2013.01); *G06K 9/4652* (2013.01)

(58) Field of Classification Search
CPC .......... H04N 1/54; G01J 3/526; G06K 9/4652
See application file for complete search history.

(56) References Cited

U.S. PATENT DOCUMENTS 8,711,432 B2    4/2014  Ito
2018/0367705 A1*  12/2018  Yamauchi ............ H04N 1/6019

FOREIGN PATENT DOCUMENTS

JP          5909887 B2    4/2016

* cited by examiner

*Primary Examiner* — Eric A. Rust
(74) *Attorney, Agent, or Firm* — Sughrue Mion, PLLC

(57) ABSTRACT

An image processing apparatus includes a memory and an estimation unit. The memory stores a color conversion model representing relations between plural colorimetric values obtained by performing, in plural color measurement directions, a color measurement of plural images formed on a first sheet using plural coloring materials including a luster coloring material, and coloring-material amounts used for the images for which the color measurement is performed and the color measurement directions for which the colorimetric values are obtained. The estimation unit estimates, on the basis of a colorimetric value, of a measurement target image formed on a second sheet of a type different from a type of the first sheet, obtained in a single direction and on the basis of the color conversion model, a colorimetric value, of the measurement target image, obtained in a case of performing a color measurement in a direction other than the single direction.

14 Claims, 21 Drawing Sheets

FIG. 9

WEIGHTED AVERAGE ΔE(WAVG) OF COLOR DIFFERENCES
= {w1×(COLOR DIFFERENCE BETWEEN L∗a∗b∗(15°) AND f(C, M, Y, K=0, Si, 15°))
+w2×(COLOR DIFFERENCE BETWEEN L∗a∗b∗(45°) AND f(C, M, Y, K=0, Si, 45°))
+w3×(COLOR DIFFERENCE BETWEEN L∗a∗b∗(110°) AND f(C, M, Y, K=0, Si, 110°))}/(w1+w2+w3)

w1: WEIGHTED COEFFICIENT FOR REGULAR REFLECTION DIRECTION (15°)
w2: WEIGHTED COEFFICIENT FOR FRONT DIRECTION (45°)
w3: WEIGHTED COEFFICIENT FOR DIFFUSED-LIGHT DIRECTION (110°)

CALCULATE C, M, AND Y VALUES WITH WHICH WEIGHTED AVERAGE ΔE(WAVG)
OF COLOR DIFFERENCES IS MINIMIZED.

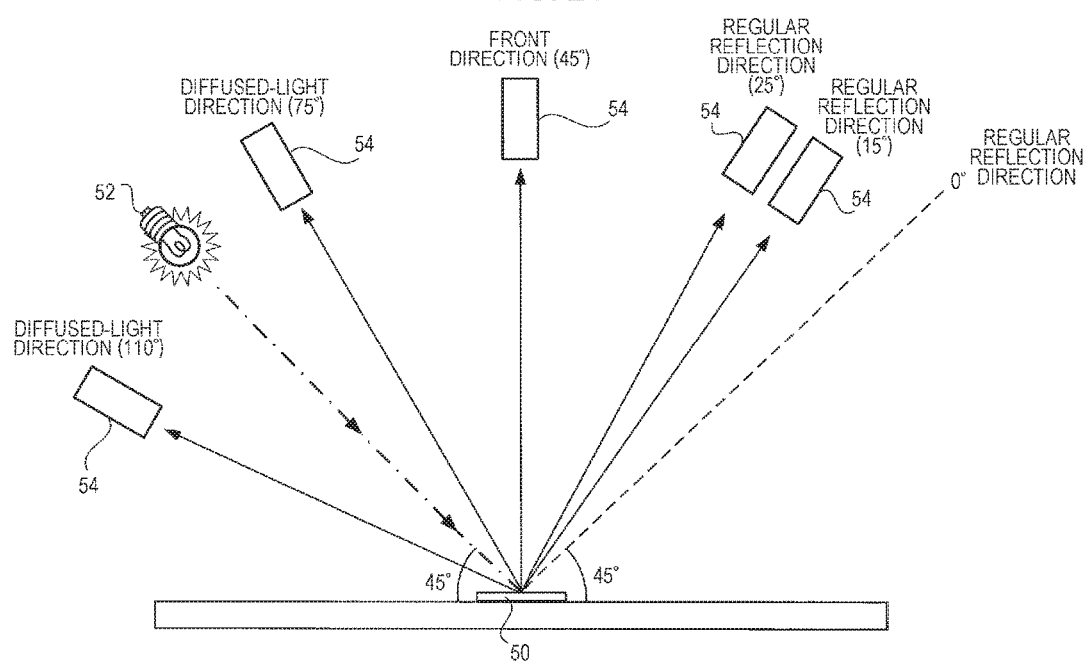

ary embodiment of the present invention will
ESTIMATING COLORIMETRIC VALUE OF MEASURED TARGET IMAGE

CROSS-REFERENCE TO RELATED APPLICATIONS

This application is based on and claims priority under 35 USC 119 from Japanese Patent Application No. 2017-161874 filed Aug. 25, 2017.

BACKGROUND

Technical Field

The present invention relates to an image processing apparatus, an image forming apparatus, and a non-transitory computer readable medium.

SUMMARY

According to an aspect of the invention, there is provided an image processing apparatus including a memory and an estimation unit. The memory stores a color conversion model representing relations between plural colorimetric values obtained by performing, in plural color measurement directions, a color measurement of each of plural images formed on a first sheet using coloring materials of plural colors including a luster coloring material, and coloring-material amounts used for the images for which the color measurement is performed and the color measurement directions for which the colorimetric values are obtained. The estimation unit estimates, on the basis of a colorimetric value, of a measurement target image formed on a second sheet of a type different from a type of the first sheet, obtained in a single direction and on the basis of the color conversion model stored in the memory, a colorimetric value, of the measurement target image, obtained in a case of performing a color measurement in a direction other than the single direction.

BRIEF DESCRIPTION OF THE DRAWINGS

An exemplary embodiment of the present invention will be described in detail based on the following figures, wherein:

FIG. 9 is a diagram for describing an objective function that is used in color conversion by a conversion unit;

FIG. 21 is a diagram for describing a case where a color measurement is performed in color measurement directions at five angles.

DETAILED DESCRIPTION

Hereinafter, an exemplary embodiment of the present invention will be described in detail with reference to the drawings.

Figure 1:
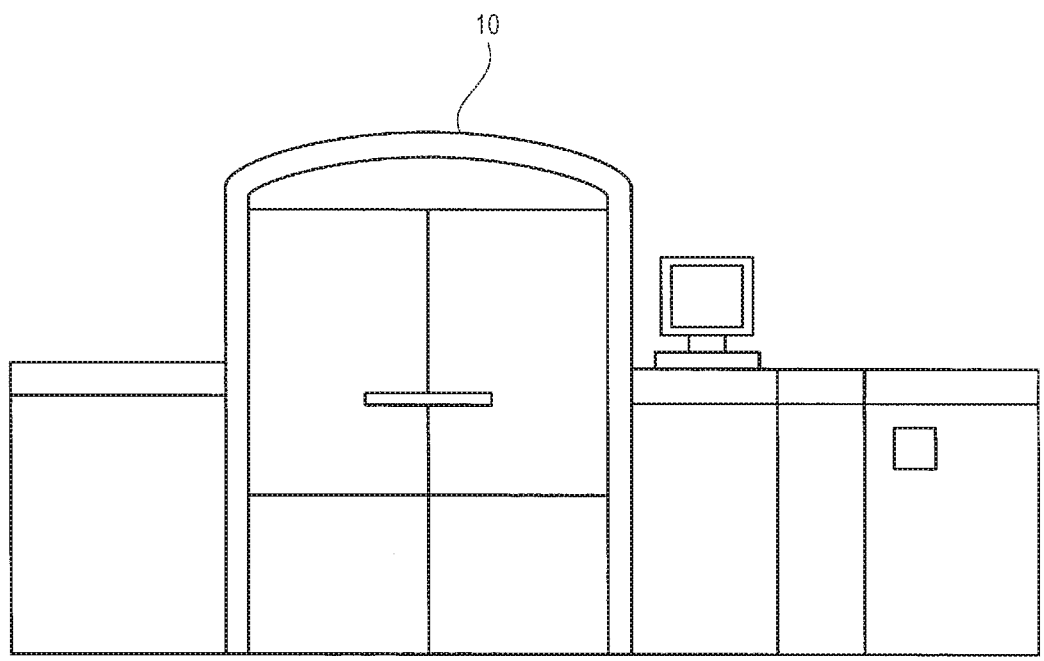
FIG. 1 is an external view of an image forming apparatus according to an exemplary embodiment of the present invention.

FIG. 1 is an external view of an image forming apparatus 10 according to an exemplary embodiment of the present invention.

The image forming apparatus 10 according to this exemplary embodiment is, as illustrated in FIG. 1, a production printer that is used in, for example, commercial printing, and has functions that enable high-speed print processing with high image quality.

Figure 2:
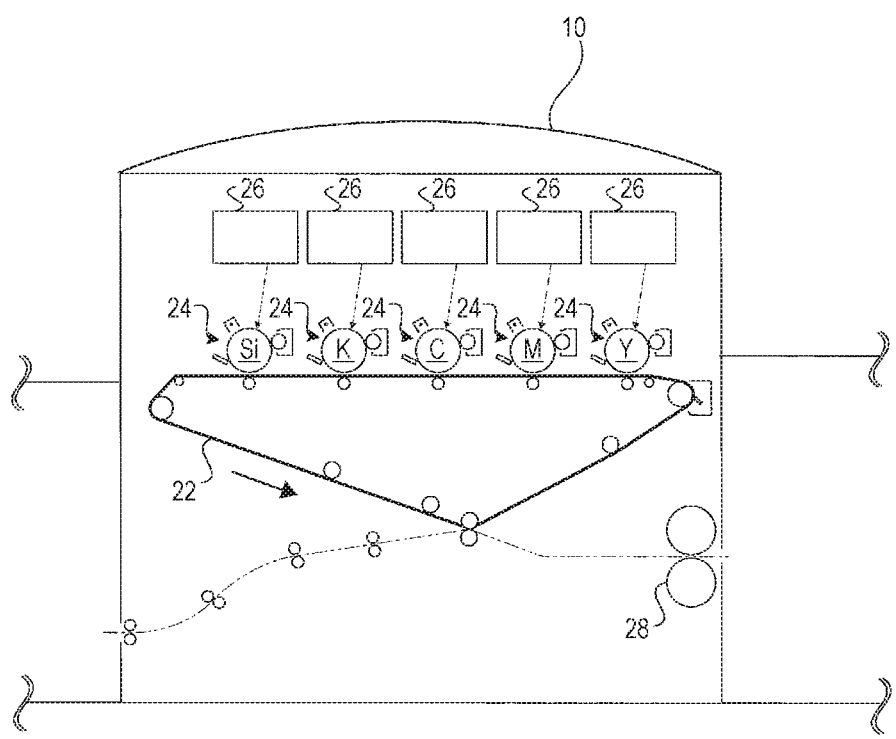
FIG. 2 is a diagram for describing a structure inside a system unit of the image forming apparatus.

The structure inside the system unit of the image forming apparatus 10 is described with reference to FIG. 2. As illustrated in FIG. 2, the image forming apparatus 10 includes five image forming units 24. The five image forming units 24 are configured to form images using toners of yellow (Y), magenta (M), cyan (C), black (K), and a special color, respectively.

As the special-color toner, a silver toner (Si), a gold toner (G), a clear toner, a white toner, and so on are available. It is allowed to select and use one toner from among these special-color toners. FIG. 2 illustrates a case where a silver toner (Si) is selected and set from among the special-color toners.

Note that, in this exemplary embodiment, a case is described where an image is formed by using a metallic (metallic gloss color) toner, such as a silver toner or a gold toner, and where toner amounts (coloring-material amounts) for respective colors, namely, C, M, Y, K, and Si, are determined. In the description given below, a case where a silver toner is used to form an image is described. A toner amount may be information about each color C, M, Y, K, or Si that is sent to a printer or may be a color value of image data that is used by a printer to perform print output. In a case where a toner amount is a color value of image data, and the image data is based on a color space that is different from a color space for printer output, a color-space conversion process needs to be performed.

A toner amount may be an amount of toner used per unit area of a recording medium, such as a toner weight ($g/m^2$). In the description given below, a toner amount is represented by a percent value (toner coverage) that is the ratio of the amount of toner of each color used in printing relative to the maximum amount of toner of the color used per unit area, such as per pixel, where the maximum amount is assumed to be equal to 100%.

The image forming units 24 each include a photoconductor drum, a charging device that uniformly charges the surface of the photoconductor drum, a developing device that develops an electrostatic latent image formed on the photoconductor drum, and so on. On the photoconductor drums of the image forming units 24, electrostatic latent images are formed by light scanning devices 26 emitting laser beams. The electrostatic latent images are developed by using toners of respective colors, and images are formed.

The images of respective colors formed by the image forming units 24 are transferred to an intermediate transfer belt 22, and thereafter, further transferred to a conveyed print sheet. The toner image transferred to the print sheet is fixed on the print sheet by a fuser 28 applying heat and pressure.

Figure 3:
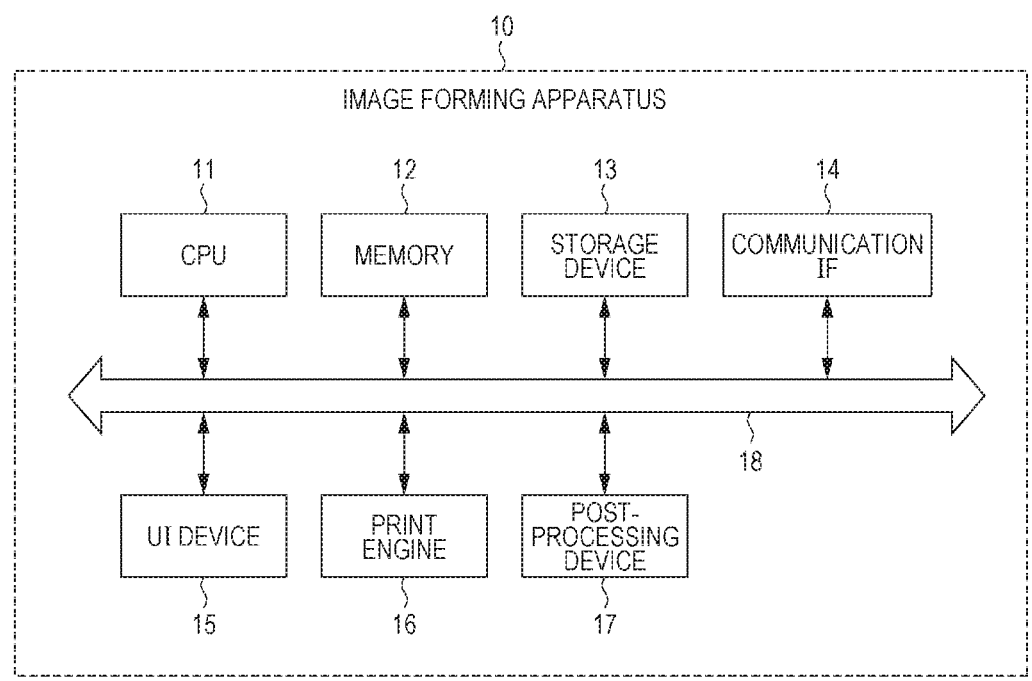
FIG. 3 is a block diagram illustrating a hardware configuration of the image forming apparatus according to an exemplary embodiment of the present invention.

The hardware configuration of the image forming apparatus 10 according to this exemplary embodiment is illustrated in FIG. 3.

As illustrated in FIG. 3, the image forming apparatus 10 includes a central processing unit (CPU) 11, a memory 12, a storage device 13, which is, for example, a hard disk drive (HDD), a communication interface (IF) 14, which is used to transmit/receive data to/from an external apparatus and so on via a network, a user interface (UI) device 15, which includes a touch panel, or a liquid crystal display and a keyboard, a print engine 16, and a post-processing device 17. These constituent elements are connected to one another via a control bus 18.

The print engine 16 performs processes of charging, exposure, development, transfer, fixing, and so on to print an image on a recording medium, such as a print sheet. The post-processing device 17 performs various post-processes, such as a stapling process, a punching process, and a folding process, for a sheet that has been subjected to print processing by the print engine 16.

The CPU 11 performs a predetermined process on the basis of a control program stored in the memory 12 or in the storage device 13 to control operations of the image forming apparatus 10. In this exemplary embodiment, it is assumed that the CPU 11 reads and executes the control program stored in the memory 12 or in the storage device 13 as described above; however, the control program may be stored in a storage medium, such as a compact disc read-only memory (CD-ROM) and provided to the CPU 11.

Figure 4:
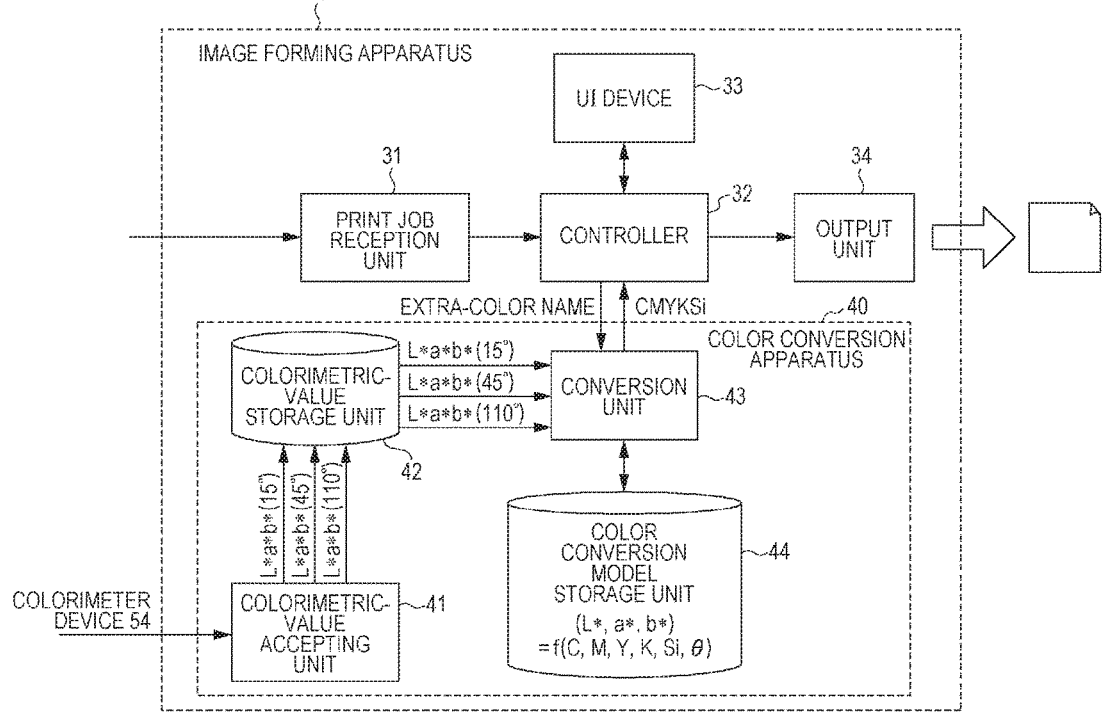
FIG. 4 is a block diagram illustrating a functional configuration of the image forming apparatus according to an exemplary embodiment of the present invention.

FIG. 4 is a block diagram illustrating a functional configuration of the image forming apparatus 10 implemented by executing the above-described control program.

As illustrated in FIG. 4, the image forming apparatus 10 according to this exemplary embodiment includes a print job reception unit 31, a controller 32, a UI device 33, an output unit 34, and a color conversion apparatus 40. The color conversion apparatus 40 includes a colorimetric-value accepting unit 41, a colorimetric-value storage unit 42, a conversion unit 43, and a color conversion model (printer model) storage unit 44. The color conversion apparatus 40 functions as an image processing apparatus that performs image processing including generation of a color conversion model in addition to a color conversion process for determining toner amounts.

The print job reception unit 31 receives a print instruction from, for example, an external terminal apparatus via a network.

The controller 32 controls the output unit 34 on the basis of a print job received by the print job reception unit 31 to thereby perform print processing.

The UI device 33 is a device for receiving an operation by a user and displaying various types of information to a user.

In a case where an extra color is specified for an image in a print job received by the print job reception unit 31, the controller 32 transfers information indicating the name of the specified extra color (or extra-color number) to the color conversion apparatus 40 and determines a toner amount for the specified extra color in accordance with an instruction from the color conversion apparatus 40.

To determine a toner amount for an extra color, the color conversion apparatus 40 receives, from a colorimeter 54, and stores in advance colorimetric values obtained by performing a color measurement of a color sample image of the extra color. When receiving information indicating the name of the extra color, the color conversion apparatus 40 converts the stored colorimetric values to C, M, Y, K, and Si values including a value for a silver toner (Si toner) and outputs the obtained values to the controller 32. The colorimetric-value accepting unit 41, the colorimetric-value storage unit 42, the conversion unit 43, and the color conversion model storage unit 44, which constitute the color conversion apparatus 40, are described below.

As the color sample image of an extra color, any of the various color sample images of metallic colors provided by, for example, PANTONE (registered trademark) may be used.

The colorimetric-value accepting unit 41 accepts plural colorimetric values obtained by performing, in plural directions, a color measurement of a target color image, which is a color sample of an extra color. Specifically, the target color image is illuminated with light in a diagonal direction as illustrated in FIG. 5, and the colorimetric-value accepting unit 41 accepts colorimetric values of the target color image obtained in a front direction (45°), which is a direction normal to the target color image, colorimetric values of the target color image obtained in a regular reflection direction (15°) relative to the illumination light, and colorimetric values of the target color image obtained in a diffused-light direction (110°) on a side close to the entry direction of the illumination light relative to the front direction (45°).

Figure 5:
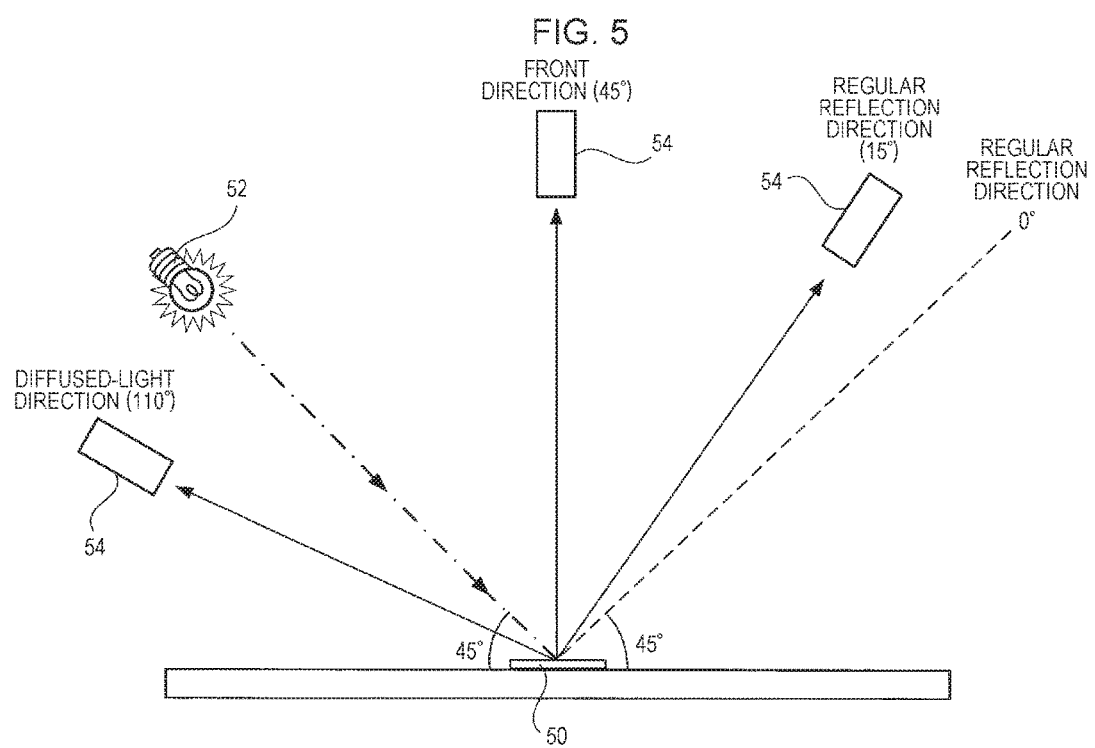
FIG. 5 is a diagram illustrating a case where a color measurement of a measurement target image is performed in color measurement directions at three angles (15°, 45°, and 110°)

FIG. 5 is a diagram illustrating a case where a color measurement of a measurement target image 50 is performed in color measurement directions at three angles (15°, 45°, and 110°). FIG. 5 illustrates a state where illumination light from a light source 52 is emitted to the measurement target image 50 in a diagonal direction at 45° and, when the regular reflection direction is assumed to correspond to 0° (reference direction), a color measurement is performed by the colorimeter 54 in directions at 15°, 45°, and 110°.

In FIG. 5, the direction at 45° is the front direction of (the direction normal to) the measurement target image 50. The direction at 15° is a regular reflection direction in which a color measurement of regular reflection light from the measurement target image 50 is performed. The regular reflection direction in which a color measurement of regular reflection light is performed is not set to the direction at 0° and is shifted by 15°. This is because, if a color measurement is performed in the direction at 0°, regular reflection light directly enters the colorimeter 54, and the colorimeter 54 is unable to measure the color tone of the measurement target.

In FIG. 5, the direction at 110° is set as a diffused-light direction in which a color measurement of diffused light from the measurement target image 50 is performed.

In a case of a color measurement of an ordinary image other than an image, such as a color sample of a metallic color, for which the color tone changes depending on the viewing direction, the color measurement is performed in only the front direction (45°). In this exemplary embodiment, a color measurement is performed also in the regular reflection direction (15°) and in the diffused-light direction (110°) in addition to the front direction (45°) to obtain colorimetric values, which is a difference from an ordinary color measurement method.

Note that colorimetric values obtained in at least two directions, namely, for example, the front direction (45°) and the regular reflection direction (15°), may be used to calculate color values including the toner amount of a silver toner.

The colorimetric-value storage unit 42 stores the colorimetric values in plural color measurement directions accepted by the colorimetric-value accepting unit 41 together with information, such as an extra-color name (or extra-color number), with which the extra color is identifiable.

When receiving information indicating an extra-color name from the controller 32, the conversion unit 43 reads colorimetric values corresponding to the extra-color name from the colorimetric-value storage unit 42 and converts the read colorimetric values, which are colorimetric values obtained in plural color measurement directions, to color values (C, M, Y, K, and Si). The color values include a value Si indicating the toner amount of a silver toner, which is a luster coloring material, and values C, M, Y, and K indicating the toner amounts of toners other than the silver toner.

Figure 6:
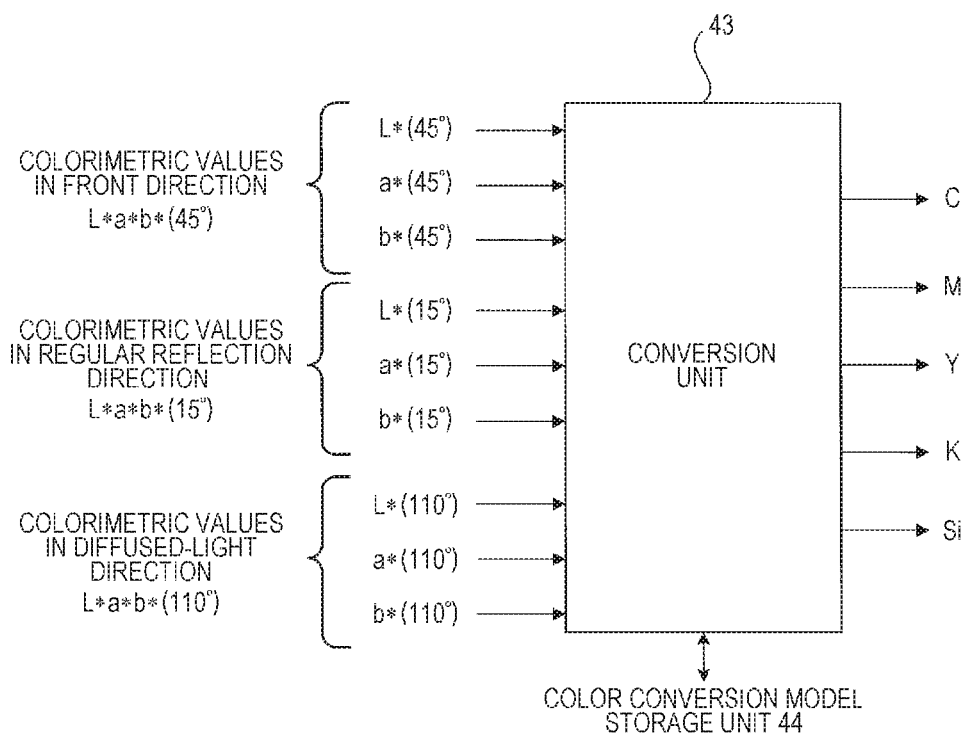
FIG. 6 is a diagram illustrating a case where colorimetric values in color measurement directions at three angles are converted to values (C, M, Y, K, and Si) that indicate the toner amounts of respective color toners.

FIG. 6 illustrates a state where the conversion unit 43 converts colorimetric values obtained in color measurement directions at three angles to values (C, M, Y, K, and Si) indicating the toner amounts of respective color toners.

In this exemplary embodiment, a description is given under the assumption that colorimetric values output from the colorimeter 54 are signals represented in accordance with the L*a*b* color system of International Commission on Illumination (CIE). Therefore, in the description given below, colorimetric values obtained in the front direction (45°) are expressed by L*a*b*(45°), colorimetric values obtained in the regular reflection direction (15°) are expressed by L*a*b*(15°), and colorimetric values obtained in the diffused-light direction (110°) are expressed by L*a*b*(110°).

As illustrated in FIG. 6, the conversion unit 43 receives colorimetric values (L*(45°), a*(45°), and b*(45°)) obtained in the front direction, colorimetric values (L*(15°), a*(15°), and b*(15°)) obtained in the regular reflection direction, and colorimetric values (L*(110°), a*(110°), andb*(110°)) obtained in the diffused-light direction, uses a color conversion model stored in the color conversion model storage unit 44, and outputs C, M, Y, K, and Si values. This process performed by the conversion unit 43 to convert received colorimetric values to C, M, Y, K, and Si values using the color conversion model will be described in detail below.

As described above, in the case where an extra color is specified in a print job received by the print job reception unit 31, the controller 32 controls the output unit 34 to output an image on the basis of the color values (C, M, Y, K, and Si) obtained as a result of conversion by the conversion unit 43 in the color conversion apparatus 40.

The color conversion model storage unit 44 stores a color conversion model ((L*, a*, b*)=f(C, M, Y, K, Si, θ)) in which combinations of toner amounts of respective color toners are associated with colorimetric values obtained as a result of actual color measurements and the methods of the color measurements. Note that the color conversion model ((L*, a*, b*)=f(C, M, Y, K, Si, θ)) illustrated in FIG. 4 is a reference-sheet color conversion model that is used in a case of reproducing a target color image on a predetermined reference sheet (first sheet).

Figure 7:
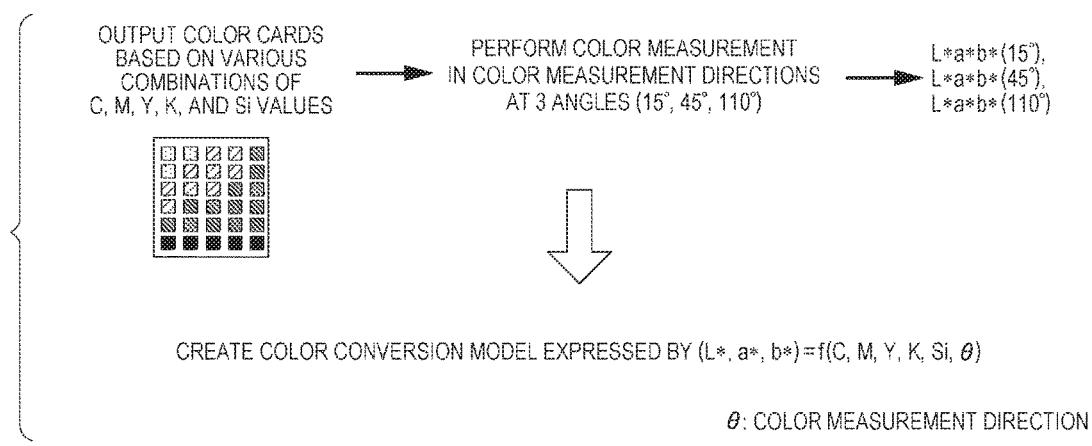
FIG. 7 is a diagram for describing a method for creating a color conversion model that is stored in a color conversion model storage unit.

A method for creating the color conversion model in the color conversion model storage unit 44 is described with reference to FIG. 7.

First, an image of color cards (color patches) based on various combinations of C, M, Y, K, and Si values is output. Subsequently, a color measurement of each color card is performed in color measurement directions at three angles (15°, 45°, and 110°) in accordance with the color measurement method as illustrated in FIG. 5. As a result, colorimetric values L*a*b*(15°), L*a*b*(45°), and L*a*b*(110°) are obtained for each color card.

On the basis of these values, a color conversion model with which color values (L*, a*, and b*) are obtained from input values C, M, Y, K, Si, and θ (color measurement direction) is created.

Specifically, colors reproduced on the basis of various combinations of C, M, Y, K, Si, and θ values are measured in advance to obtain L*, a*, and b* values, thereby obtaining plural sets of values (C, M, Y, K, Si, and θ) and values (L*, a*, and b*). These sets are used to obtain a functional relation expressed by (L*, a*, b*)=f(C, M, Y, K, Si, θ), which is used as the color conversion model. When the color conversion model is used, and the toner amounts for the respective colors C, M, Y, K, and Si and the color measurement direction θ are given, it is possible to obtain predicted color values L*, a*, and b*. As the function used for this color conversion model, a function typically used as a color conversion model, such as multiple regression, a neural network, or interpolation using a direct look-up table, may be used.

Accordingly, the color conversion model (reference-sheet color conversion model) expressed by the function (L*, a*, b*)=f(C, M, Y, K, Si, θ) is created, and the created color conversion model is stored in the color conversion model storage unit 44.

Figure 8:
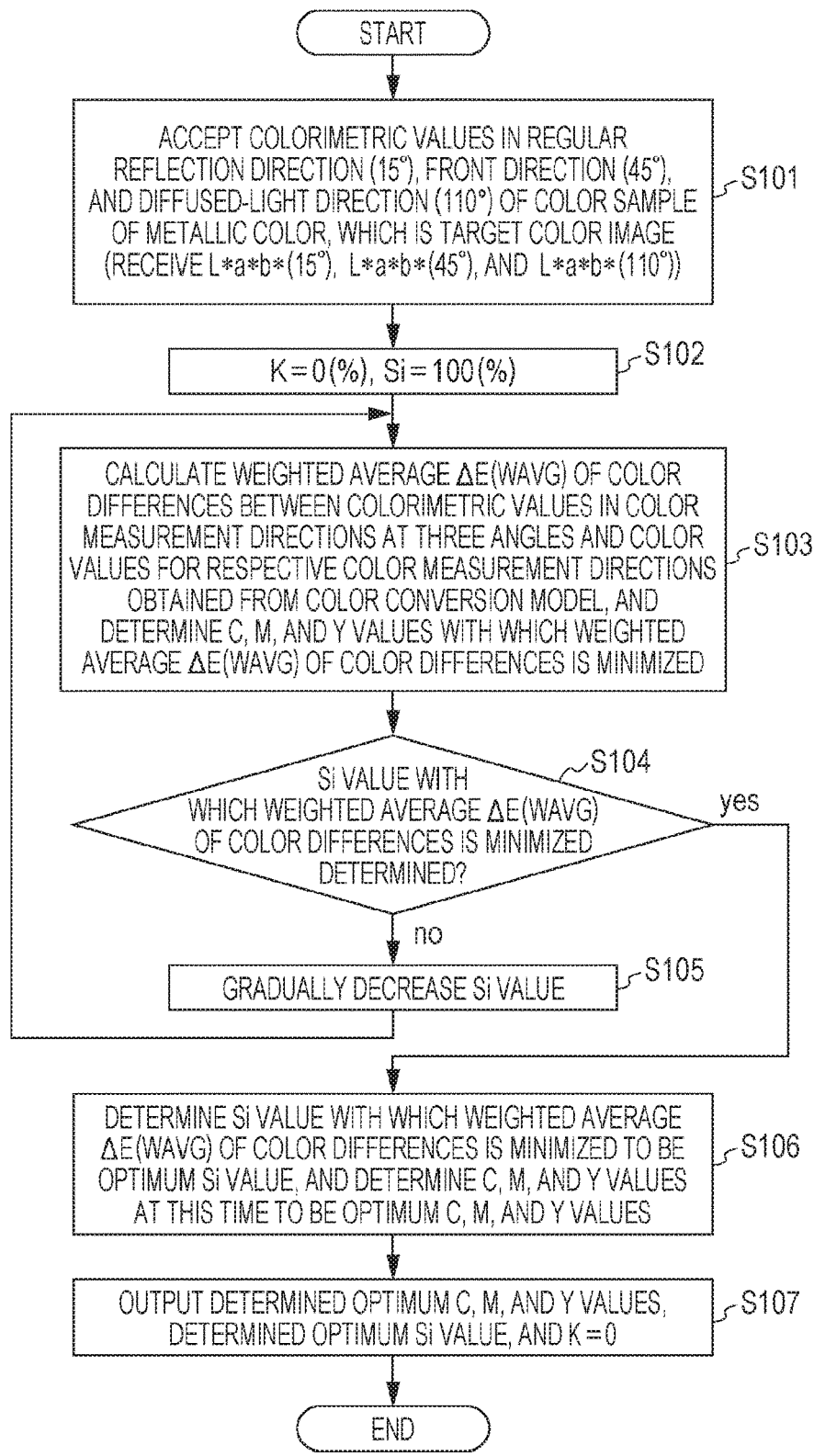
FIG. 8 is a flowchart for describing an operation of a color conversion apparatus in the image forming apparatus according to an exemplary embodiment of the present invention.

Now, an operation of the color conversion apparatus 40 in the image forming apparatus 10 according to this exemplary embodiment is described with reference to the flowchart illustrated in FIG. 8.

First, the colorimetric-value accepting unit 41 accepts colorimetric values (L*a*b*(15°), L*a*b*(45°), and L*a*b*(110°)) of a color sample of a metallic color, which is a target color image, respectively obtained in the regular reflection direction (15°), the front direction (45°), and the diffused-light direction (110°) (step S101). The colorimetric values obtained in the three color measurement directions and accepted by the colorimetric-value accepting unit 41 are stored in the colorimetric-value storage unit 42 together with information indicating the extra-color name.

Next, in a case where the controller 32 specifies the extra-color name and the conversion unit 43 is to determine the amount of a toner of the specified extra color, the conversion unit 43 initially sets the K value to 0(%) and the Si value to 100(%) (step S102).

Subsequently, the conversion unit 43 determines a combination of coloring-material amounts with which the average of the color differences between the colorimetric values of the target color image obtained in the respective color measurement directions at three angles and color values for the respective color measurement directions obtained from the color conversion model is minimized (step S103).

Specifically, the conversion unit 43 calculates the weighted average ΔE(WAVG) of the color differences between the colorimetric values of the target color image obtained in the respective color measurement directions at three angles and color values for the respective color measurement directions obtained from the color conversion model, and determines C, M, and Y values with which the weighted average ΔE(WAVG) of the color differences is minimized.

A specific example of the weighted average of the color differences is described with reference to FIG. 9. As illustrated in FIG. 9, the weighted average is calculated by using the following expression.

Weighted average ΔE(WAVG) of color differences in respective color measurement directions={w1×(color difference between L*a*b*(15°) and f(C, M, Y, 0, Si, 15))+w2×(color difference between L*a*b*(45°) and f(C, M, Y, 0, Si, 45))+w3×(color difference between L*a*b*(110°) and f(C, M, Y, 0, Si, 110))}/(w1+w2+w3)

Here, w1, w2, and w3 are respectively a weighted coefficient for the regular reflection direction (15°), a weighted coefficient for the front direction (45°), and a weighted coefficient for the diffused-light direction (110°) and are usually set to the same values.

For example, in a case of processing color differences in the respective color measurement directions with the same weights, the weighted coefficients need to be set so as to satisfy w1=w2=w3=1. In this case, the weighted average ΔE(WAVG) of the color differences becomes a simple average.

In a case of adjusting the metallic appearance of an output image, w1, w2, and w3 need to be changed. For example, when w1 is set to a weighted coefficient larger than w2 and w3, C, M, and Y values are determined such that the color difference in the regular reflection direction (15°) is further reduced to thereby obtain an image having a more metallic appearance.

The color difference ΔE(PQ) between a color value P=($L_1^*$, $a_1^*$, $b_1^*$) and a color value Q=($L_2^*$, $a_2^*$, $b_2^*$) is calculated by using the following expression.

$$\Delta E(PQ) = ((L_1^* - L_2^*)^2 + (a_1^* - a_2^*)^2 + (b_1^* - b_2^*)^2)^{1/2}$$

Subsequently, the conversion unit 43 calculates C, M, and Y values with which the weighted average ΔE(WAVG) of the color differences is minimized. Here, as a specific method used by the conversion unit 43 to calculate C, M, and Y values with which the weighted average ΔE(WAVG) of the color differences is minimized, a general method for addressing an optimization problem by applying a numerical solution for a nonlinear equation, such as the simplex method or the Newton's method, may be used.

If an Si value with which the weighted average ΔE(WAVG) of the color differences is minimized is determined (yes in step S104), the flow proceeds to step S106. However, at this point in time, such an Si value is not determined (no in step S104), and therefore, the conversion unit 43 gradually decreases the Si value from 100% to, for example, 99%, 98%, 97%, and so on (step S105).

Subsequently, the conversion unit 43 performs the process in step S103 again and repeats the process until an Si value with which the weighted average ΔE(WAVG) of the color differences is minimized is determined. If an Si value with which the weighted average ΔE(WAVG) of the color differences is minimized is determined (yes in step S104), the conversion unit 43 determines the Si value to be an optimum Si value (step S106).

The method for determining the optimum Si value is described with reference to FIG. 10.

Figure 10:
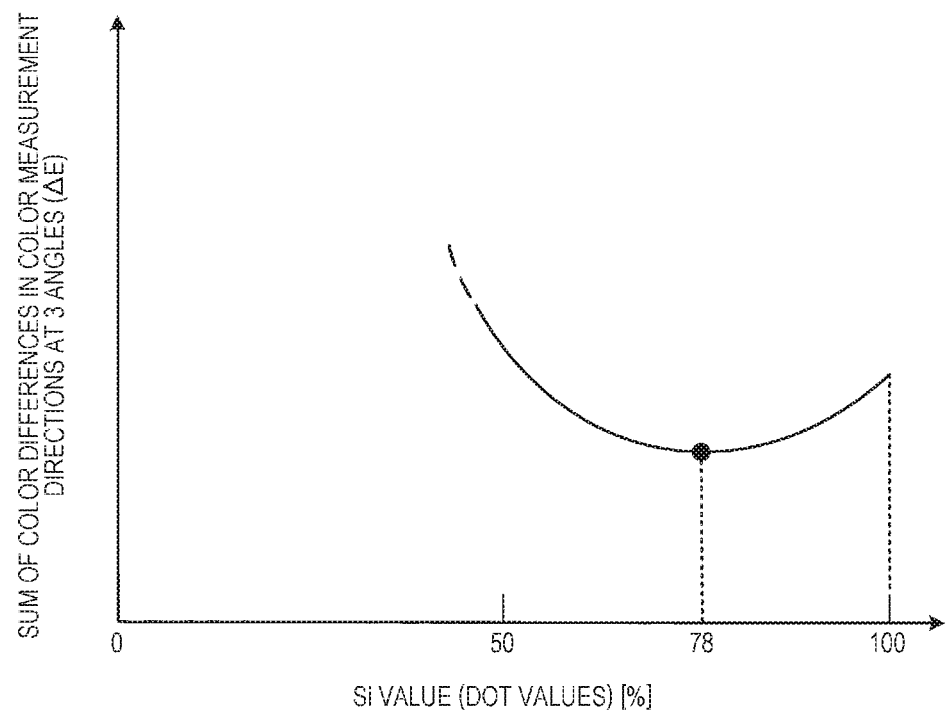
FIG. 10 is a diagram for describing a method for determining an optimum Si value.

It is assumed that, when the weighted average ΔE(WAVG) of the color differences in the color measurement directions at three angles is calculated while gradually decreasing the Si value from 100% as described above, the weighted average ΔE(WAVG) of the color differences changes as illustrated in FIG. 10. In the case illustrated in FIG. 10, an Si value of 78% at which the weighted average ΔE(WAVG) of the color differences is minimized is the optimum Si value.

Subsequently, the conversion unit 43 determines C, M, and Y values when the optimum Si value is obtained to be optimum C, M, and Y values (step S106). That is, the conversion unit 43 calculates the minimum value of the weighted average of the color differences in a case of changing the toner amounts of C, M, and Y toners other than an Si toner without changing the toner amount of the Si toner for respective different toner amounts of the Si toner sequentially to thereby determine the optimum Si value with which the minimum value of the weighted average of the color differences is minimized and determine the toner amounts of C, M, and Y toners when the optimum Si value is determined. Accordingly, the conversion unit 43 determines a combination of the toner amounts with which the weighted average of the color differences is minimized.

The conversion unit 43 last outputs the optimum C, M, and Y values, the optimum Si value, and K=0(%) to the controller 32 as the toner amounts C, M, Y, K, and Si for the color sample image of a metallic color for which a color measurement has been performed (step S107).

As described above, the conversion unit 43 first calculates the weighted average ΔE(WAVG) of the color differences in the case of changing the toner amounts of color toners (C, M, and Y toners) other than an Si toner without changing the toner amount of the Si toner for respective different toner amounts of the Si toner sequentially to thereby determine a toner amount of the Si toner with which the minimum value of the weighted average ΔE(WAVG) of the color differences is minimized and determine the toner amounts of toners other than the Si toner when the toner amount of the Si toner is determined. Accordingly, the conversion unit 43 determines a combination of the toner amounts with which the average of the color differences is minimized.

Now, the reason why the color conversion apparatus 40 according to this exemplary embodiment uses colorimetric values obtained in the color measurement directions at three angles (15°, 45°, and 110°) to determine the toner amounts of C, M, Y, K, and Si toners for reproducing a color sample image of a metallic color is described below.

Figure 11:
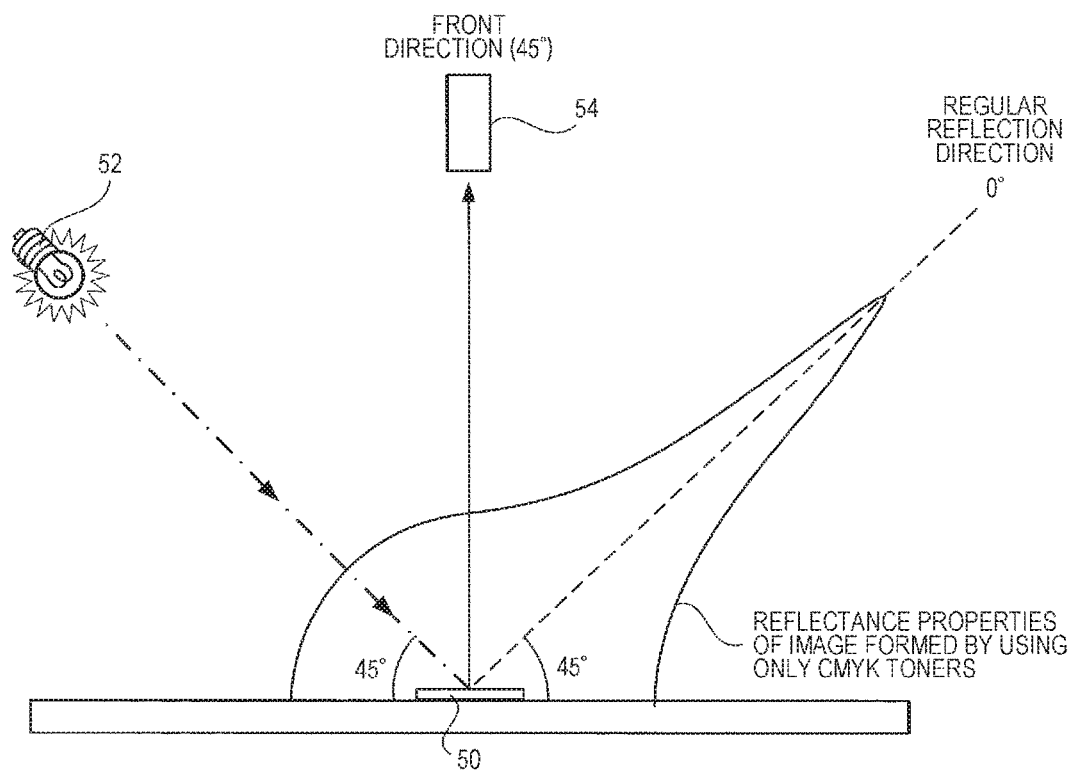
FIG. 11 is a diagram for describing a color measurement method for an ordinary image formed by using only C, M, Y, and K toners.

First, a color measurement method for an ordinary image formed by using only C, M, Y, and K toners is described with reference to FIG. 11. The reflectance properties of an ordinary image formed by using only C, M, Y, and K toners without a metallic-color toner are as illustrated in FIG. 11. It is found from FIG. 11 that the amount of light in a regular reflection direction is larger than the amount of light in the other directions and that the amounts of light of diffused light in the directions other than the regular reflection direction are substantially the same. Therefore, in an ordinary color measurement method, illumination light is emitted from the light source 52 to the measurement target image 50 in a diagonal direction, and color values in the front direction (45°) are obtained by the colorimeter 54.

Figure 12:
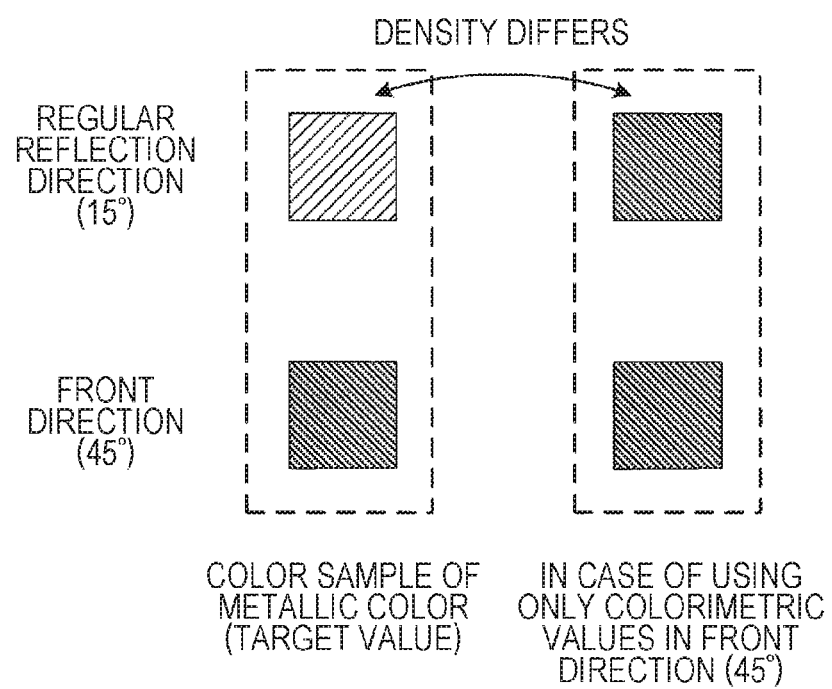
FIG. 12 is a diagram for describing an issue that arises in a case of reproducing a color sample image of a metallic color by using only colorimetric values in a front direction (45°)

In a case where a color measurement of a color sample of a metallic color is performed by using such an ordinary color measurement method, and the obtained colorimetric values are used to determine the toner amounts of C, M, Y, K, and Si toners and reproduce the color sample image, an issue arises, which is described below with reference to FIG. 12.

In the case where a color sample of a metallic color is reproduced by using only colorimetric values in the front direction (45°), it is possible to make the reproduced color tone observed in the front direction (45°) close to the actual color tone. However, the reproduced color tone observed in, for example, the regular reflection direction at 15° may be significantly different from the actual color tone. It is found from the example illustrated in FIG. 12 that, in the case of viewing in the regular reflection direction at 15°, the reproduced image printed by using C, M, Y, K, and Si toners has a density higher than that of the actual color sample of a metallic color, resulting in different density levels.

In a usual environment, an observation object is illuminated with light beams in various directions, and a person views the light beams reflected by the observation object to determine the color of the object. Therefore, regarding, for example, an image of a metallic color for which the color significantly changes depending on the viewing direction, if only a color observed in a specific direction is reproduced, the color tone observed in another direction may significantly differ from the color tone of the actual image, and the color tone observed in actual lighting might also differ.

Figure 13:
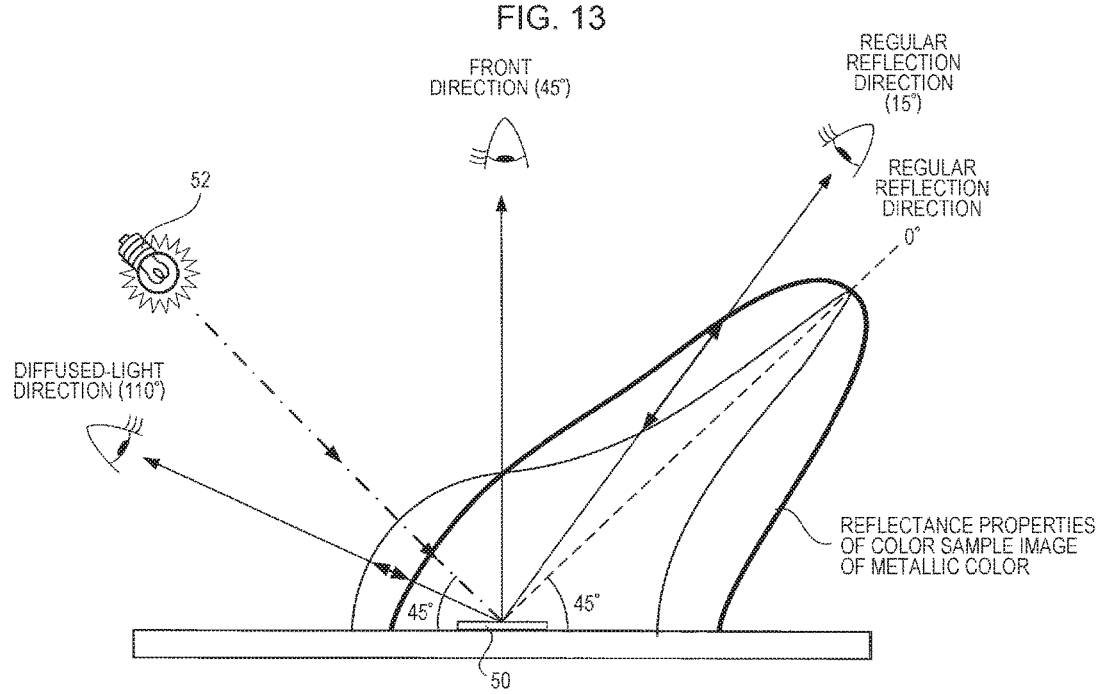
FIG. 13 is a diagram for describing a difference in reflectance properties between a CMYK toner image and a color sample image of a metallic color.

Next, a difference in reflectance properties between a CMYK toner image and a color sample image of a metallic color is described with reference to FIG. 13.

Regarding a color sample image of a metallic color and a CMYK toner image, the luminance of a color sample image of a metallic color is higher than that of a CMYK toner image in the regular reflection direction (15°) and lower than that of a CMYK toner image in the diffused-light direction (110°).

Therefore, in the color conversion apparatus 40 according to this exemplary embodiment, colorimetric values obtained in the regular reflection direction (15°) and in the diffused-light direction (110°) in addition to colorimetric values obtained in the front direction (45°) are used to determine the values of C, M, Y, K, and Si toner amounts with which the average of color differences in the respective color measurement directions is minimized to thereby reproduce an image that is close to the color sample image regardless of the viewing direction.

Figure 14:
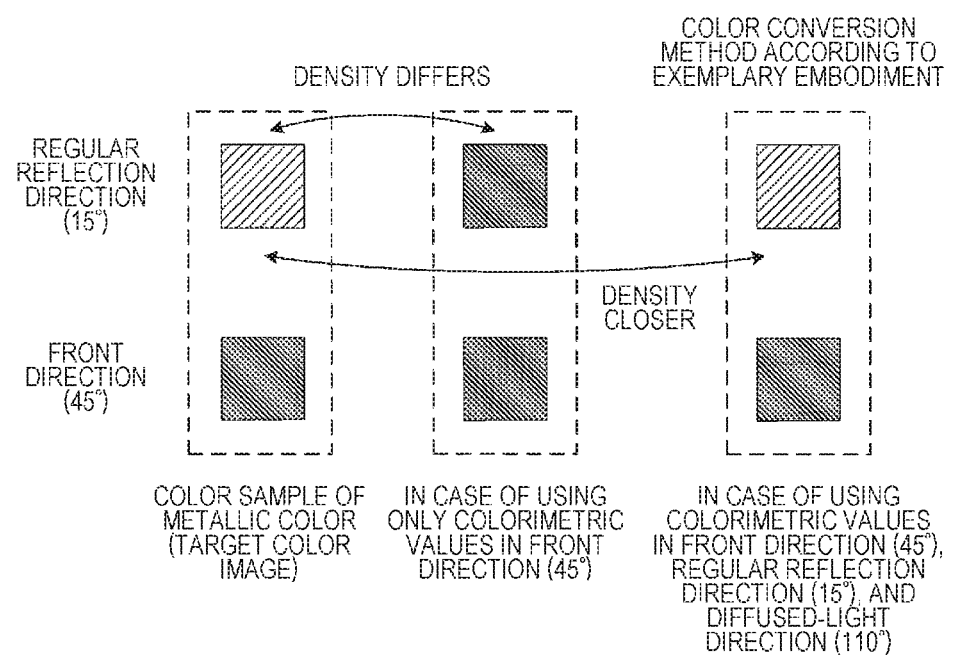
FIG. 14 is a diagram illustrating an example of a color sample image of a metallic color that is printed by determining toner amounts in accordance with a color conversion method according to an exemplary embodiment of the present invention.

FIG. 14 illustrates an example of a color sample image of a metallic color that is printed by the image forming apparatus 10 according to this exemplary embodiment determining toner amounts in accordance with the above-described color conversion method.

It is found from FIG. 14 that, in the case where an image is printed by using C, M, Y, K, and Si toners for which the toner amounts are determined in accordance with the color conversion method according to this exemplary embodiment, the color tone observed in the regular reflection direction (15°) as well as the color tone observed in the front direction (45°) is close to that of the color sample image of the metallic color. Although not illustrated in FIG. 14, regarding the color tone observed in the diffused-light direction (110°), the luminance is slightly higher than that of the color sample image. However, the toner amounts are determined by reflecting a color difference in the diffused-light direction (110°), and therefore, it is possible to make the density observed in the regular reflection direction (15°) close to that of the color sample image while reducing the color difference in the diffused-light direction (110°).

With the method for determining toner amounts as described above, it is possible to determine the toner amounts of C, M, Y, K, and Si toners used to print a target color image for which color reproducibility observed in plural directions is increased.

In a case of printing such a target color image on a sheet (second sheet) of a type different from the type of, for example, the reference sheet (first sheet) used to generate the color conversion model, the printed target color image has a different color tone.

Figure 15:
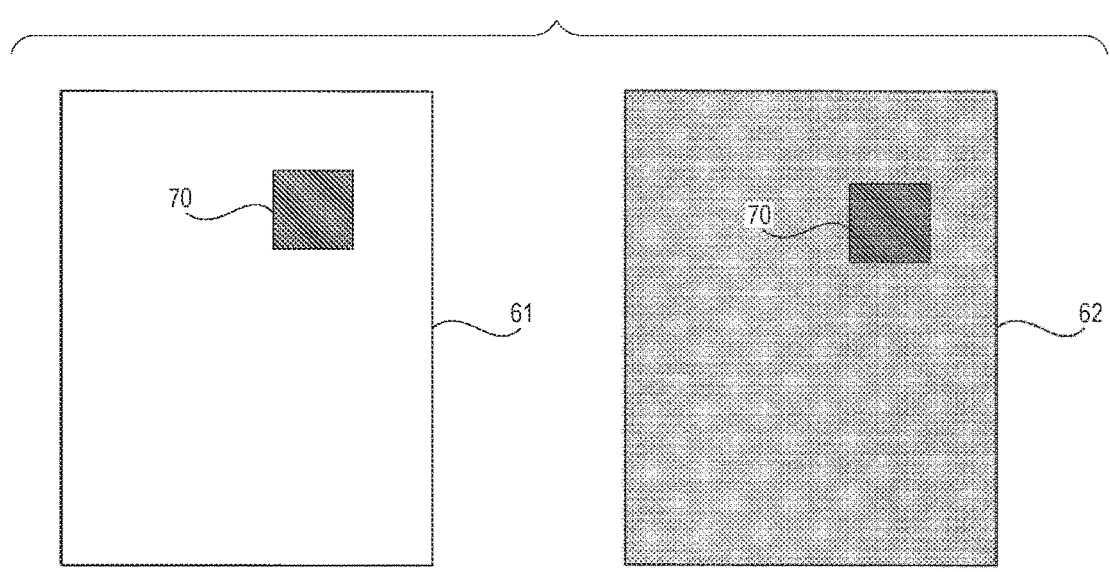
FIG. 15 is a diagram for describing a case where a color sample image is printed on a user sheet having a color tone different from that of a reference sheet that is used to generate a color conversion model.

For example, as illustrated in FIG. 15, in a case of printing a color sample image 70, in which the color of a target color image of a metallic color is reproduced, on a user sheet 62 having a color tone different from the color tone of a reference sheet 61, which is used to generate the color conversion model (reference-sheet color conversion model), the color sample image 70 has a color tone different from the color of the color sample image 70 printed on the reference sheet 61.

Further, for example, in a case where the image forming apparatus 10 is moved to a different location and the environmental temperature changes or in a case where the characteristics of toners to be used change, resulting in a change in output characteristics, the color tone of a printed target color image changes.

In such cases, a process needs to be performed in which a large number of patch images are printed on the user sheet 62, which is a sheet on which a target color image is to be printed, a color measurement of each of the patch images is performed in plural color measurement directions, and a color conversion model is generated again.

However, colorimeters that are used to perform color measurements in plural color measurement directions are expensive, and a user who does not have such colorimeters is unable to perform color measurements in plural color measurement directions.

Accordingly, the image forming apparatus 10 according to this exemplary embodiment estimates, on the basis of a color measurement performed for each of the patch images printed on the user sheet in only a single direction at 45°, colorimetric values obtained in a case of performing a color measurement in the directions at 15° and 110° and generates a user-sheet color conversion model.

Now, a specific configuration of the image forming apparatus 10 in a case of generating such a user-sheet color conversion model is described below.

Figure 16:
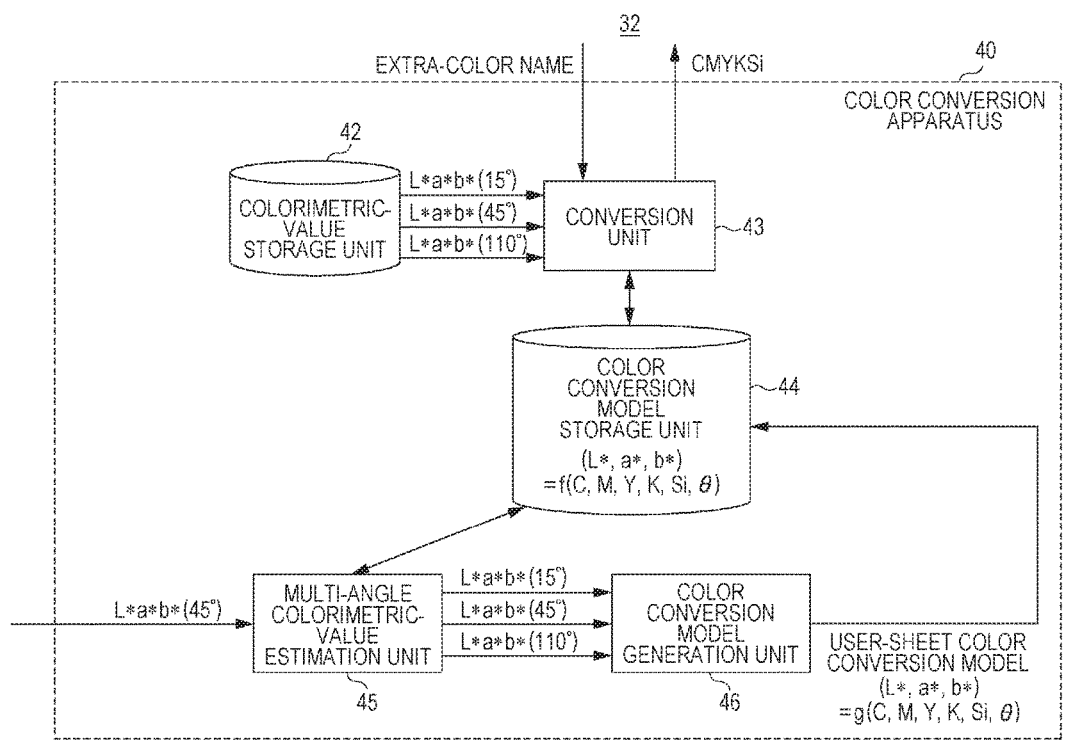
FIG. 16 is a diagram for describing a configuration of the color conversion apparatus in a case of generating a user-sheet color conversion model.

In this case, the color conversion apparatus 40 illustrated in FIG. 4 additionally includes a multi-angle colorimetric-value estimation unit 45 and a color conversion model generation unit 46, as illustrated in FIG. 16. A description is given below under the assumption that colorimetric values obtained by performing a color measurement of a color sample image of a metallic color in three directions are stored in advance in the colorimetric-value storage unit 42, and therefore, the colorimetric-value accepting unit 41 is omitted in FIG. 16.

Note that the color conversion apparatus 40 need not be included in the image forming apparatus 10 and may be included in a terminal apparatus, such as a personal computer.

The multi-angle colorimetric-value estimation unit 45 estimates, on the basis of colorimetric values of a patch image, which is a measurement target image formed on a user sheet of a type different from the type of the reference sheet, obtained in a single direction and on the basis of the color conversion model stored in the color conversion model storage unit 44, colorimetric values of the patch image on the user sheet obtained in a case of performing a color measurement in directions other than the single direction.

Specifically, the multi-angle colorimetric-value estimation unit 45 inputs the toner amount of a metallic toner used for the patch image and colorimetric values obtained in a single direction, namely, for example, the front direction (45°), to an inverse function of the color conversion model to calculate the toner amounts of toners other than the metallic toner. Then, the multi-angle colorimetric-value estimation unit 45 inputs, to the color conversion model, the calculated toner amounts of toners other than the metallic toner, the toner amount of the metallic toner input to the color conversion model, and a color measurement direction for which colorimetric values are to be obtained to estimate colorimetric values in the color measurement direction other than the single direction.

Actually, the multi-angle colorimetric-value estimation unit 45 inputs, to the inverse function of the color conversion model, the toner amount of a black toner used for the patch image as well as the toner amount of the metallic toner used for the patch image to calculate the toner amounts of toners other than the metallic toner and the black toner.

A description is further given below of a case where a patch image is illuminated with light in a diagonal direction and the multi-angle colorimetric-value estimation unit 45 estimates, on the basis of colorimetric values obtained in the front direction (45°), which is a direction normal to the patch image, colorimetric values obtained in a case of performing a color measurement in the regular reflection direction (15°) relative to the illumination light, and colorimetric values obtained in a case of performing a color measurement in the diffused-light direction (110°) on a side close to the entry direction of the illumination light relative to the front direction (45°).

The color conversion model generation unit 46 uses plural colorimetric values, of plural patch images formed on the user sheet, obtained in a single direction, namely, for example, the front direction (45°), and colorimetric values, of the plural patch images, in the regular reflection direction (15°) and in the diffused-light direction (110°) estimated by the multi-angle colorimetric-value estimation unit 45 to generate a user-sheet color conversion model (second-sheet color conversion model) in which combinations of color measurement directions and the coloring-material amounts of coloring materials of respective colors are associated with the colorimetric values for the user sheet.

The user-sheet color conversion model generated by the color conversion model generation unit 46 is stored in the color conversion model storage unit 44 and used to determine toner amounts when a color sample image of a metallic color is printed on the user sheet.

Figure 17:
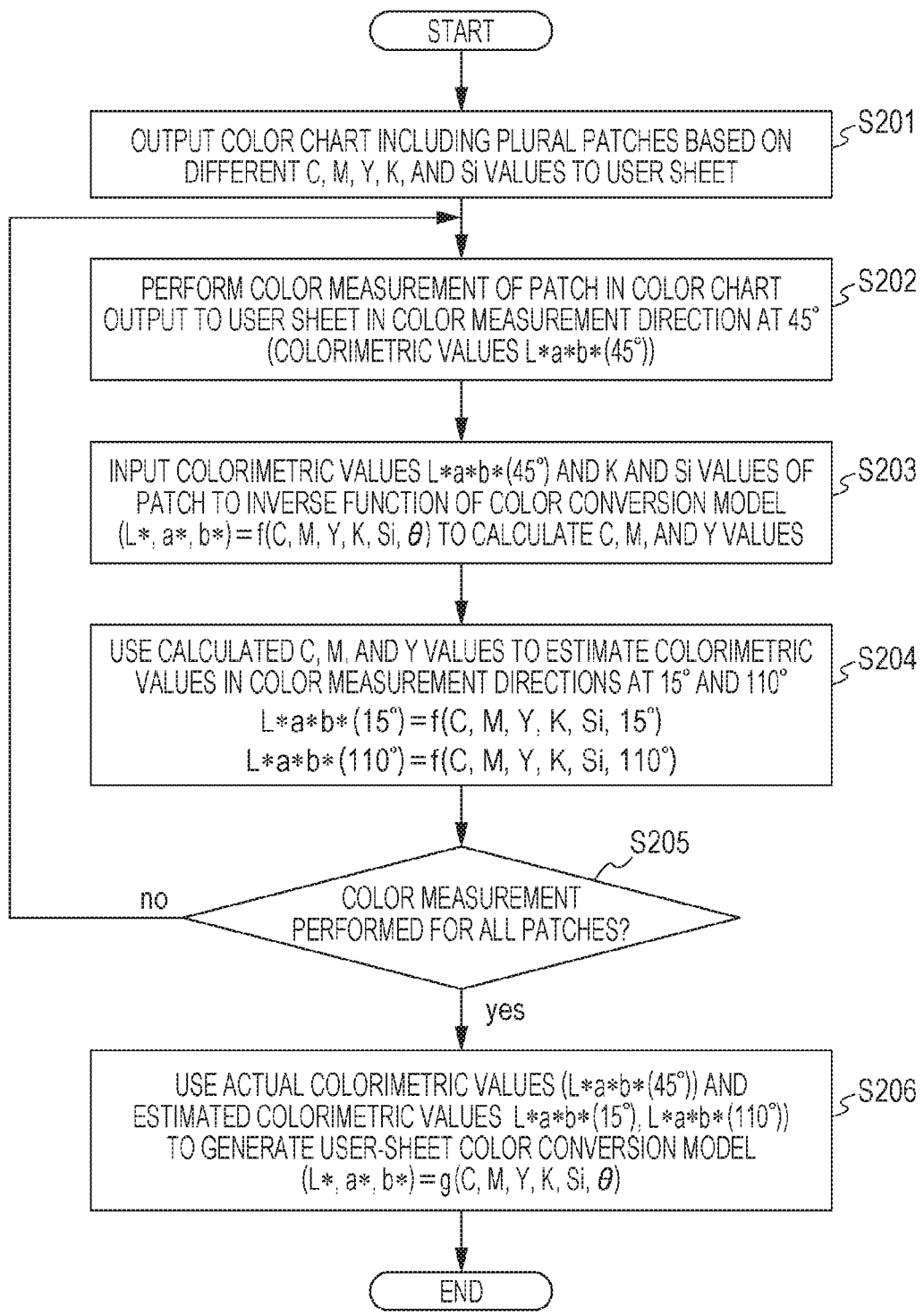
FIG. 17 is a flowchart for describing an operation of a multi-angle colorimetric-value estimation unit and a color conversion model generation unit generating the user-sheet color conversion model.

Now, a method used by the multi-angle colorimetric-value estimation unit 45 and the color conversion model generation unit 46 to generate the user-sheet color conversion model is described with reference to the flowchart in FIG. 17.

Figure 18:
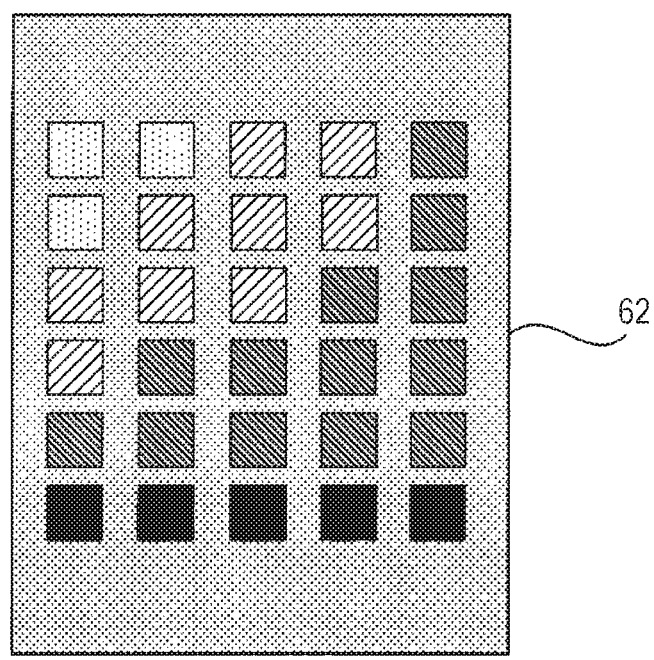
FIG. 18 is a diagram illustrating a case where a color chart is output to a user sheet on which a color sample image is to be printed.

First, a color chart including plural patch images (color-card images) based on various different C, M, Y, K, and Si values is output to a user sheet (step S201). FIG. 18 illustrates an example case where a color chart is output to the user sheet 62 on which a color sample image is to be printed.

Next, a colorimeter capable of performing a color measurement is used to perform a color measurement of each patch image on the user sheet 62 in a single direction, specifically, the front direction (45°) (step S202). As a result, colorimetric values L*a*b*(45°) are obtained for the patch image.

Subsequently, the multi-angle colorimetric-value estimation unit 45 inputs, to an inverse function ( ) of the color conversion model, the colorimetric values L*a*b*(45°) of the patch image and information indicating a K value and an Si value used to output the patch image to calculate C, M, and Y values (step S203).

The multi-angle colorimetric-value estimation unit 45 inputs, to the color conversion model f(C, M, Y, K, Si, θ), the calculated C, M, and Y values, the K value and the Si value of the patch image, and color measurement directions (15° and 110°) to calculate colorimetric values (L*a*b*(15°) in the regular reflection direction and colorimetric values (L*a*b*(110°) in the diffused-light direction (step S204).

The multi-angle colorimetric-value estimation unit 45 repeats the process from step S202 to step S204 described above for all of the patch images in the color chart (step S205).

Subsequently, the color conversion model generation unit 46 generates, on the basis of the colorimetric values actually obtained in the front direction (45°) and the colorimetric values in the regular reflection direction (15°) and in the diffused-light direction (110°) estimated by the multi-angle colorimetric-value estimation unit 45, a user-sheet color conversion model ((L*, a*, b*)=g(C, M, Y, K, Si, θ)), which is used to calculate toner amounts for printing a color sample image on the user sheet 62 (step S206).

Figure 19:
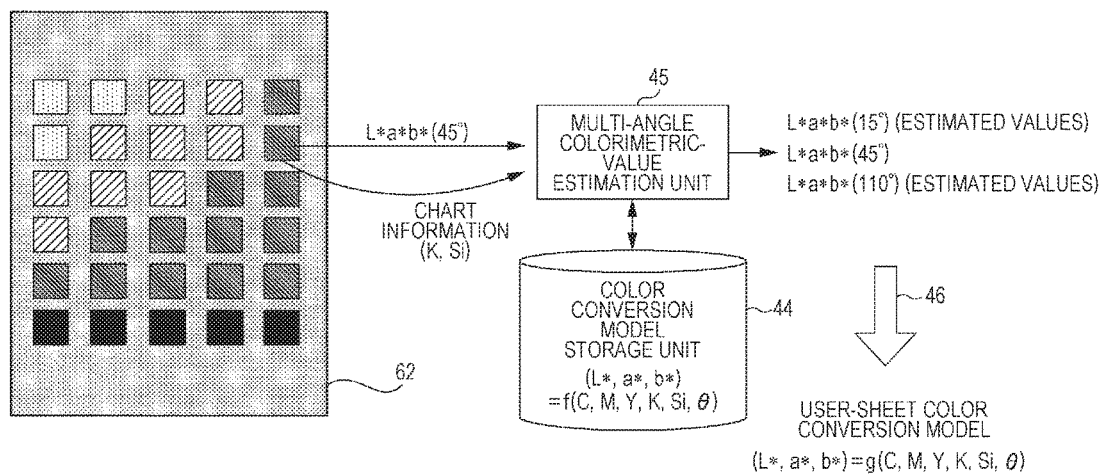
FIG. 19 is a diagram illustrating a state where the multi-angle colorimetric-value estimation unit and the color conversion model generation unit generate the user-sheet color conversion model.

FIG. 19 illustrates a state where the multi-angle colorimetric-value estimation unit 45 and the color conversion model generation unit 46 generate the user-sheet color conversion model as described above.

Figure 20:
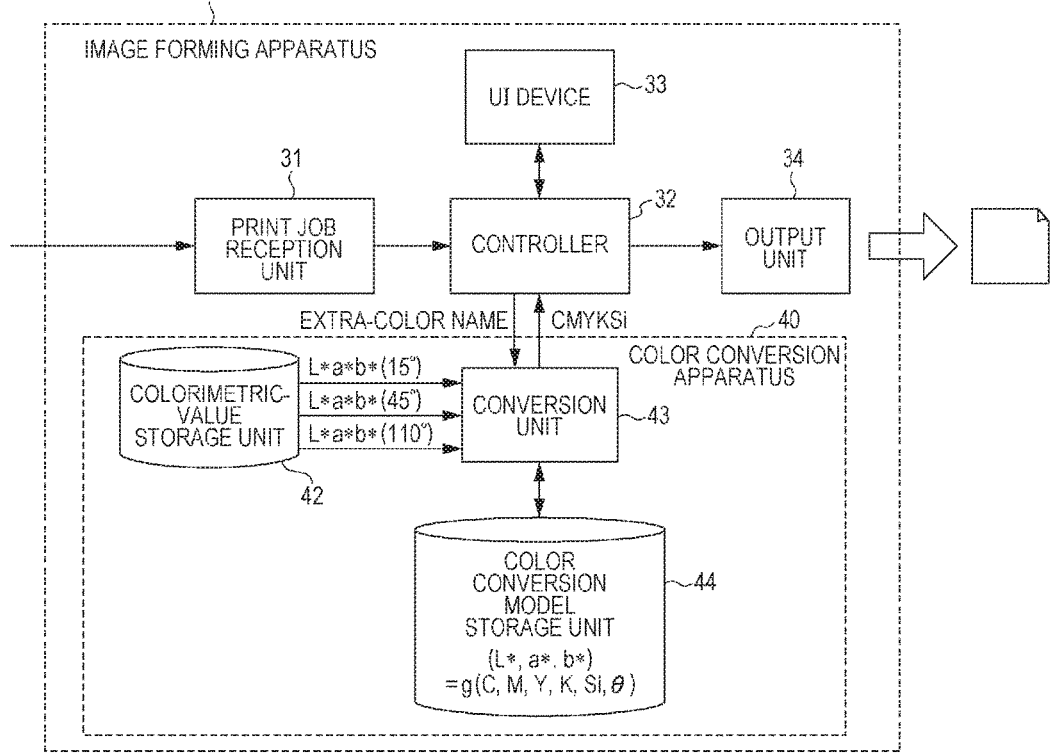
FIG. 20 is a diagram for describing a configuration of the image forming apparatus in a case of calculating toner amounts for printing a color sample image of a metallic color on a user sheet.

The user-sheet color conversion model ((L*, a*, b*)=g(C, M, Y, K, Si, θ)) thus generated is stored in the color conversion model storage unit 44. In a case of calculating toner amounts used to print a color sample image on the user sheet 62, the conversion unit 43 uses the user-sheet color conversion model ((L*, a*, b*)=g(C, M, Y, K, Si, θ)) stored in the color conversion model storage unit 44 to calculate toner amounts, as illustrated in FIG. 20.

In the description given above, the case has been described where the toner amounts of the respective color toners including a silver toner are calculated by using colorimetric values in the color measurement directions at three angles, namely, the regular reflection direction (15°), the front direction (45°), and the diffused-light direction (110°). However, the toner amounts may be calculated by using colorimetric values in color measurement directions at multiple angles, such as four angles or five angles, more than three angles. FIG. 21 illustrates an example case where a color measurement of the measurement target image 50 is performed in color measurement directions at five angles, namely, the regular reflection direction (15°), a regular reflection direction (25°), the front direction (45°), a diffused-light direction (75°), and the diffused-light direction (110°).

When colorimetric values in the color measurement directions at five angles obtained in accordance with the color measurement method as illustrated in FIG. 21 are used, it is possible to calculate the toner amounts of the respective color toners including a silver toner by using a method similar to the method described above.

That is, the conversion unit 43 may calculate the toner amounts of the respective color toners by using colorimetric values of the target color image obtained in the direction (25°) closer to the regular reflection direction (15°) than to the front direction (45°) and colorimetric values of the target color image obtained in the diffused-light direction (75°) between the front direction (45°) and the illumination direction of the light source 52 in addition to colorimetric values obtained in the regular reflection direction (15°), the front direction (45°), and the diffused-light direction (110°). Further, it is possible to use colorimetric values obtained in a color measurement direction other than the color measurement directions illustrated in FIG. 21.

As the number of colorimetric values used to calculate the toner amounts increases, it is possible to make the color tone observed in actual lighting closer to that of the color sample image.

Modification

In the description given above, the case has been described where the exemplary embodiment is applied to an image forming apparatus that performs printing using a metallic (metallic gloss color) toner, such as a silver toner or a gold toner; however, the exemplary embodiment of the present invention is not limited to this case. The exemplary embodiment of the present invention is also applicable to a case where printing is performed by using a luster coloring material, such as a pearly coloring material other than toners, which produces a color tone that changes depending on the viewing direction.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a memory that stores a color conversion model representing relations between a plurality of colorimetric values obtained by performing, in a plurality of color measurement directions, a color measurement of each of a plurality of images formed on a first sheet using coloring materials of a plurality of colors including a luster coloring material, and coloring-material amounts used for the images for which the color measurement is performed and the color measurement directions for which the colorimetric values are obtained; and
an estimation unit that estimates, on the basis of a colorimetric value, of a measurement target image formed on a second sheet of a type different from a type of the first sheet, obtained in a single direction and on the basis of the color conversion model stored in the memory, a colorimetric value, of the measurement target image, obtained in a case of performing a color measurement in a direction other than the single direction.

2. The image processing apparatus according to claim 1, wherein
the estimation unit inputs, to an inverse function of the color conversion model, a coloring-material amount of the luster coloring material used for the measurement target image and the colorimetric value of the measurement target image obtained in the single direction to calculate a coloring-material amount of a coloring material other than the luster coloring material, and inputs, to the color conversion model, the calculated coloring-material amount of a coloring material other than the luster coloring material, the coloring-material amount of the luster coloring material input to the color conversion model, and a color measurement direction for which a colorimetric value is to be obtained to estimate the colorimetric value in the color measurement direction other than the single direction.

3. The image processing apparatus according to claim 2, wherein
the estimation unit inputs, to the inverse function of the color conversion model, a coloring-material amount of a black coloring material used for the measurement target image in addition to the coloring-material amount of the luster coloring material used for the measurement target image to calculate a coloring-material amount of a coloring material other than the luster coloring material and the black coloring material.

4. The image processing apparatus according to claim 3, further comprising
a generation unit that uses a plurality of colorimetric values, of a plurality of measurement target images formed on the second sheet, obtained in a single direction and colorimetric values of the plurality of measurement target images estimated by the estimation unit to generate a second-sheet color conversion model in which combinations of the color measurement directions and coloring-material amounts of coloring materials of respective colors are associated with the colorimetric values for the second sheet.

5. The image processing apparatus according to claim 4, further comprising
a conversion unit that determines a combination of coloring-material amounts with which an average of color differences between a plurality of colorimetric values accepted by an accepting unit and color values for the respective color measurement directions obtained from the second-sheet color conversion model is minimized to convert the plurality of colorimetric values accepted by the accepting unit to color values including a value indicating the coloring-material amount of the luster coloring material and a value indicating the coloring-material amount of a coloring material other than the luster coloring material.

6. The image processing apparatus according to claim 2, further comprising
- a generation unit that uses a plurality of colorimetric values, of a plurality of measurement target images formed on the second sheet, obtained in a single direction and colorimetric values of the plurality of measurement target images estimated by the estimation unit to generate a second-sheet color conversion model in which combinations of the color measurement directions and coloring-material amounts of coloring materials of respective colors are associated with the colorimetric values for the second sheet.

7. The image processing apparatus according to claim 6, further comprising
- a conversion unit that determines a combination of coloring-material amounts with which an average of color differences between a plurality of colorimetric values accepted by an accepting unit and color values for the respective color measurement directions obtained from the second-sheet color conversion model is minimized to convert the plurality of colorimetric values accepted by the accepting unit to color values including a value indicating the coloring-material amount of the luster coloring material and a value indicating the coloring-material amount of a coloring material other than the luster coloring material.

8. The image processing apparatus according to claim 1, further comprising
- a generation unit that uses a plurality of colorimetric values, of a plurality of measurement target images formed on the second sheet, obtained in a single direction and colorimetric values of the plurality of measurement target images estimated by the estimation unit to generate a second-sheet color conversion model in which combinations of the color measurement directions and coloring-material amounts of coloring materials of respective colors are associated with the colorimetric values for the second sheet.

9. The image processing apparatus according to claim 8, further comprising
- a conversion unit that determines a combination of coloring-material amounts with which an average of color differences between a plurality of colorimetric values accepted by an accepting unit and color values for the respective color measurement directions obtained from the second-sheet color conversion model is minimized to convert the plurality of colorimetric values accepted by the accepting unit to color values including a value indicating a coloring-material amount of the luster coloring material and a value indicating a coloring-material amount of a coloring material other than the luster coloring material.

10. The image processing apparatus according to claim 1, wherein
- in a case where the measurement target image is illuminated with light in a diagonal direction, the estimation unit estimates, on the basis of a colorimetric value obtained in a front direction, which is a direction normal to the measurement target image, a colorimetric value obtained in a case of performing a color measurement in a regular reflection direction relative to the illumination light.

11. The image processing apparatus according to claim 10, wherein
the estimation unit further estimates a colorimetric value obtained in a case of performing a color measurement in a diffused-light direction on a side close to an entry direction of the illumination light relative to the front direction.

12. The image processing apparatus according to claim 1, wherein
the luster coloring material is a metallic gloss color toner.

13. An image forming apparatus comprising:
- a memory that stores a color conversion model representing relations between a plurality of colorimetric values obtained by performing, in a plurality of color measurement directions, a color measurement of each of a plurality of images formed on a first sheet using coloring materials of a plurality of colors including a luster coloring material, and coloring-material amounts used for the images for which the color measurement is performed and the color measurement directions for which the colorimetric values are obtained;
- an estimation unit that estimates, on the basis of a colorimetric value, of a measurement target image formed on a second sheet of a type different from a type of the first sheet, obtained in a single direction and on the basis of the color conversion model stored in the memory, a colorimetric value, of the measurement target image, obtained in a case of performing a color measurement in a direction other than the single direction;
- a generation unit that uses a plurality of colorimetric values, of a plurality of measurement target images formed on the second sheet, obtained in a single direction and colorimetric values of the plurality of measurement target images estimated by the estimation unit to generate a second-sheet color conversion model in which combinations of the color measurement directions and coloring-material amounts of coloring materials of respective colors are associated with the colorimetric values for the second sheet;
- an accepting unit that accepts a plurality of colorimetric values obtained by performing a color measurement of a luster target color image in the plurality of color measurement directions;
- a conversion unit that determines a combination of coloring-material amounts with which an average of color differences between the plurality of colorimetric values accepted by the accepting unit and color values for the respective color measurement directions obtained from the second-sheet color conversion model is minimized to convert the plurality of colorimetric values accepted by the accepting unit to color values including a value indicating a coloring-material amount of the luster coloring material and a value indicating a coloring-material amount of a coloring material other than the luster coloring material; and
- an output unit that outputs an image on the basis of the color values obtained as a result of conversion by the conversion unit.

14. A non-transitory computer readable medium storing a program causing a computer to execute a process for image processing, the process comprising:
- storing a color conversion model representing relations between a plurality of colorimetric values obtained by performing, in a plurality of color measurement directions, a color measurement of each of a plurality of images formed on a first sheet using coloring materials of a plurality of colors including a luster coloring material, and coloring-material amounts used for the images for which the color measurement is performed and the color measurement directions for which the colorimetric values are obtained; and estimating, on the basis of a colorimetric value, of a measurement target image formed on a second sheet of a type different from a type of the first sheet, obtained in a single direction and on the basis of the color conversion model stored in the storing, a colorimetric value, of the measurement target image, obtained in a case of performing a color measurement in a direction other than the single direction.

* * * * *